(12) United States Patent
Copty

(10) Patent No.: US 8,200,655 B2
(45) Date of Patent: Jun. 12, 2012

(54) QUERY-BASED GENERATION OF DATA RECORDS

(75) Inventor: Shady Copty, Nazareth (IL)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/357,428

(22) Filed: Jan. 22, 2009

(65) Prior Publication Data

US 2010/0185694 A1    Jul. 22, 2010

(51) Int. Cl.
*G06F 7/00* (2006.01)
*G06F 17/00* (2006.01)

(52) U.S. Cl. .................. 707/713; 707/722; 707/805

(58) Field of Classification Search .......... 707/713, 707/722, 805
See application file for complete search history.

(56) References Cited

U.S. PATENT DOCUMENTS

| | | | |
|---|---|---|---|
| 5,546,576 A * | 8/1996 | Cochrane et al. ...... 707/999.002 |
| 5,701,471 A | 12/1997 | Subramanyam | |
| 6,138,112 A * | 10/2000 | Slutz ............................ 707/748 |
| 7,143,081 B2 * | 11/2006 | Dettinger et al. ...... 707/999.002 |
| 2003/0061170 A1 * | 3/2003 | Uzo ................................ 705/64 |
| 2005/0222827 A1 * | 10/2005 | Emek et al. ........................ 703/2 |
| 2005/0256852 A1 * | 11/2005 | McNall et al. ..................... 707/3 |
| 2007/0255667 A1 * | 11/2007 | Emek et al. ..................... 706/19 |
| 2009/0077001 A1 * | 3/2009 | Macready et al. .............. 706/57 |
| 2009/0240664 A1 * | 9/2009 | Dinker et al. ..................... 707/3 |

OTHER PUBLICATIONS

Don Slutz, "Massive Stochastic Testing of SQL", Proceedings of the 24th VLDB Conference, New York, USA, 1998, pp. 618-622.

* cited by examiner

*Primary Examiner* — Phong Nguyen

(57) ABSTRACT

A method and apparatus for generating at least one data record in respect to a database query comprising a fetch command. A database may be updated according to the at least one data record. In an exemplary embodiment, a database management system may be tested by performing the database query against the database. In another exemplary embodiment, a data record that satisfies the database query is generated in order to increase coverage when testing a database management system.

19 Claims, 4 Drawing Sheets

QUERY-BASED GENERATION OF DATA RECORDS

BACKGROUND

The present disclosure relates to database management systems in general, and to testing database management systems, in particular.

In the computerized environment surrounding us, data stored in computing devices becomes more and more vital to our everyday life, and the need to store that data in a reliable database is ever more crucial. Various database management systems (DBMS), known in the art, such as Microsoft SQL server, IBM DB2, Oracle database and others. Each DBMS employs different algorithms to store data records in a database, to provide a reliable storage means, and to enable a retrieval of relevant data records upon request. A DBMS may use various database models such as a network model or a relational model to describe the structure of a database. A DBMS may provide a user of the DBMS with a schema of the database which does not depend on the method of physically organizing the data records in the database. Some DBMSs may use decentralized algorithms for retrieving data records from the database. Some DBMSs may optimize their performance according to specialized optimizations which may take into account, for example, statistical information of the data records being stored in the database. Other optimizations may affect a use of an index for fast retrieval, an access path to retrieve data records, an order in which to examine different data structures, such as data tables, a strategy of joining different data structures and the like.

BRIEF SUMMARY OF THE INVENTION

One exemplary embodiment of the disclosed subject matter is a computerized apparatus comprising: an interface for receiving a first database query, the first database query comprises a fetch command; and a data generation module for generating at least one data record; the at least one data record satisfies at least a portion of a second database query associated with the fetch command.

Another exemplary embodiment of the disclosed subject matter is a method comprising: receiving a first database query; the database query comprises a fetch command; generating at least one data record; the at least one data record satisfies at least a portion of a second database query associated with the fetch command; and storing the at least one data record in a database having an initial state; whereby modifying a state of the database; and whereby a database management system which performs the first database query behaves differently with respect to the database than in respect to the initial state of the database.

Yet another exemplary embodiment of the disclosed subject matter is a computer program product for generating at least one data record, the computer program product comprising: a computer readable medium; first program instructions to receive a first database query; the first database query comprising a fetch command; second program instructions to generate at least one data record; the at least one data record satisfies at least a portion of a second database query associated with the fetch command; and wherein the first and second program instructions are stored on the computer readable media.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
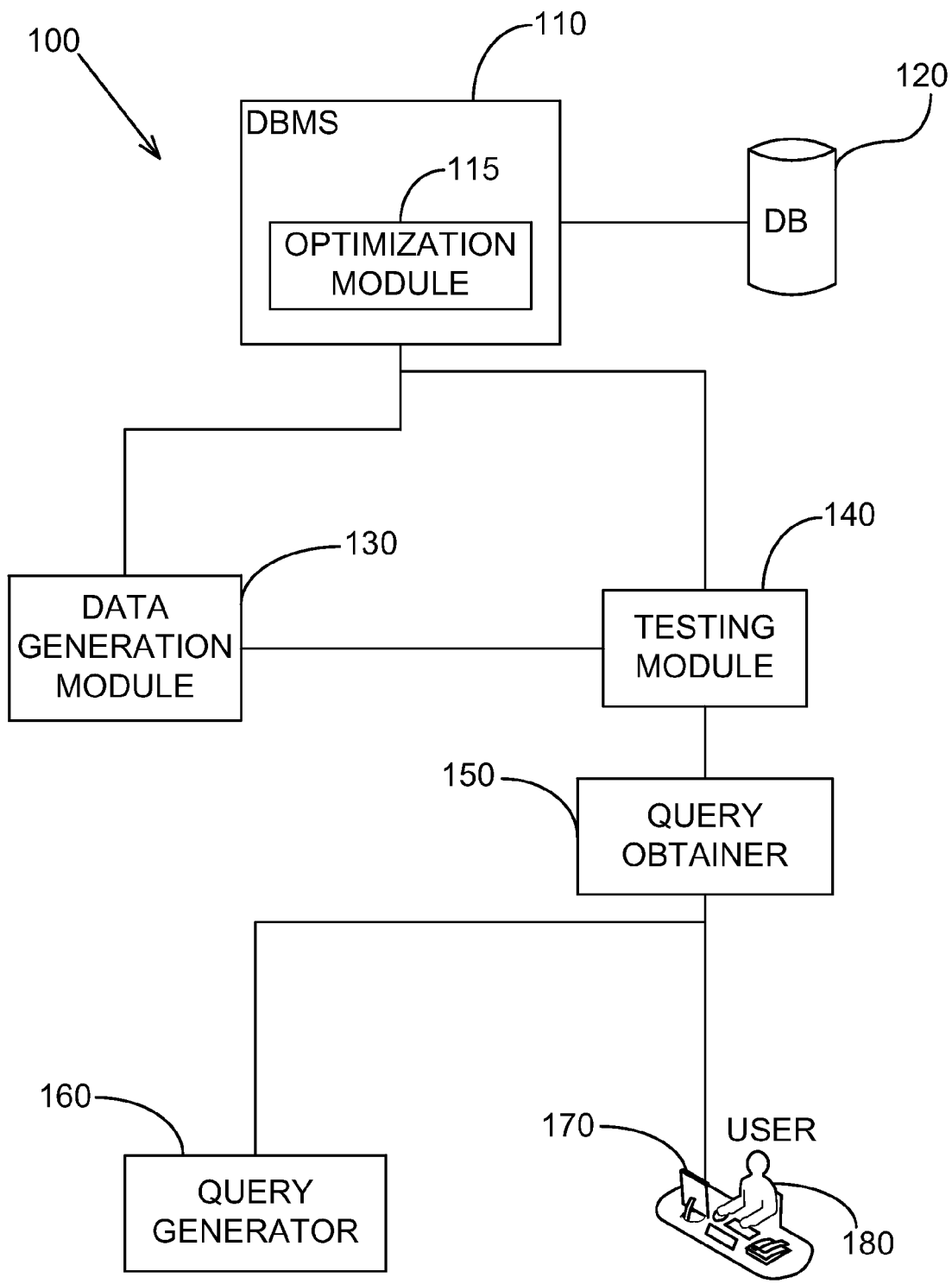
FIG. 1 shows a typical computerized environment in which the disclosed subject matter is used, in accordance with some exemplary embodiments of the subject matter.

The disclosed subject matter is described below with reference to flowchart illustrations and/or block diagrams of methods, apparatus (systems) and computer program products according to embodiments of the subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is to avoid testing of a DBMS with database queries that have no result due to a content of a database. Another technical problem dealt with by the disclosed subject matter is to enable testing of a DBMS without providing a testing unit with an existing database; as such a database may be unavailable due to various reasons. For example, in case the existing database contains sensitive information or is subject to rules, guidelines or internal regulations that forbids disclosure of a content of the database to other personnel, as is sometimes the case when an error occurs in a client's computerized site. Other reasons for the unavailability of the database may be that it does not exist anywhere or was not compiled or gathered. Yet another technical problem dealt with by the disclosed subject matter is to enable benchmark testing of a DBMS to determine a quality level of the DBMS by testing an execution of a set of database queries by the DBMS.

One technical solution is to provide a data generation module to generate data records in relation to a database query. Another technical solution is to provide a testing module to test the execution of the DBMS by updating a content of a database with data records that were generated in respect to the DBMS as well as executing a database query and inspecting the performance of the DBMS. Yet another technical solution is to provide a query obtainer for obtaining a database query to be used to test the DBMS and generate a data record in the database in respect to the database query. The term obtaining may also refer to receiving, retrieving, assembling generating or a combination thereof. An additional technical solution is to generate a set of constraints which relate to a database query to be used to test the DBMS. In some exemplary embodiments of the disclosed subject matter, a data record is generated based on a solution of the set of constraints that a constraint satisfaction solver provided.

One technical effect of utilizing the disclosed subject matter is modifying a content of a database in relation to a database query in such a way that a result of a database query on an original database is different from a result of the database query on a modified database. Another technical effect is modifying a computer readable medium to contain a set of constraints relating to a database query. Yet another technical effect is obtaining information about execution of a DBMS with regard to a database query. An additional technical effect is to ensure that a predetermined instruction set of the DBMS is executed. For example, if a database does not contain any data record that should be returned as a result of a database query, an optimization performed by the DBMS may determine that not all the constraints forced by the database query should be examined.

Referring now to FIG. 1 showing a typical computerized environment in which the disclosed subject matter is used, in accordance with some exemplary embodiments of the subject matter. A computerized environment 100 comprises a database (DB) 120 and a database management system (DBMS) 110. In some exemplary embodiments of the disclosed subject matter, the DB 120 is a logical representation of the physical manner in which data is stored in a computer readable medium. It will be noted that the DB 120 may be a centralized or decentralized database using any kind of computer readable memory to store data, may comprise one or more servers or other computerized apparatuses and the like. The DBMS 110 may manipulate the DB 120 according to a user request (not shown). For example, updating the DB 120 or retrieving data records from the DB 120. The user request may be formed in a query language such as but not limited to SQL, XQuery, OQL and the like.

The DBMS 110 may further comprise an optimization module 115 for optimizing the performance of the DBMS 110 according to various optimization algorithms. In some exemplary DBMSs 110, the optimization module 115 may provide an optimization according to parameters such as the content of the DB 120, the user request, resources available to the DBMS 110 such as memory, CPU, communication bandwidth, servers and the like. The optimization may further depend on statistical information regarding a content of the DB 120, logical operations requested to be performed according to the user request, indexing of the DB 120, estimated number of data records that the user request addresses and the like.

The computerized environment 100 may further comprise a testing module 140 and/or a query obtainer 150. The testing module 140 performs testing or other quality assurance (QA) operations to detect bugs in the DBMS 110 or other quality measurements such as but not limited to performance of the DBMS 110. The query obtainer 150 obtains a database query formalized in a query language that is compatible, either directly or indirectly via translation, compilation, interpretation, modification and the like, with the DBMS 110.

In some exemplary embodiments of the disclosed subject matter, the database query is a fetch command such as selection of data records, selection of data fields, selection of a portion of a schema, and the like; a data manipulation command such as insertion, deletion, update, merge and the like; a transaction control command such as commit, rollback and the like; a data definition command such as definition of schema, redefinition of schema, manipulation of data objects within a schema, altering a schema or data objects and the like; a data control command such as granting or revoking authorization, and the like. In some exemplary embodiments of the disclosed subject matter, a database query is a combination of one or more database commands. For example, a data manipulation command may manipulate a data record that is fetched using a fetch command. In the SQL query language one exemplary database query which comprises a fetch command and a data manipulation command may be "update T set a=10 where b>10", where data records of table T are fetched according to the value of field "b" and their value in field "a" is modified.

In some exemplary embodiments of the disclosed subject matter, the query obtainer 150 may receive the database query from a user 180, such as but not limited to a developer of the DBMS 110 or a QA personnel of the DBMS 110, using a terminal 170 or other man-machine interface. The database query (not shown) may comprise a database query which the user 180 designed to execute a predetermined instructions of the DBMS 110, for example an instruction of the optimization module 115. The database query may be a query that has caused a problematic behavior of the DBMS 110 in the past, for example a query utilized by a user (not shown) of the DBMS 110 and returned erroneous results or performed otherwise poorly.

In some other exemplary embodiments of the disclosed subject matter, the query obtainer 150 receives the database query from a query generator 160. The query generator 160 may generate the database query randomly, for example, using a parse tree of the query language and traversing it randomly or stochastically. In yet other exemplary embodiments of the disclosed subject matter, the query obtainer 150 may receive the database query from a database query server (not shown), a database query database (not shown), a third-party benchmark module (not shown) and the like. In some exemplary embodiments, the query obtainer 150 may be configured to passively receive the database query. In other exemplary embodiments, the query obtainer 150 actively acquires the database query.

In some exemplary embodiments of the disclosed subject matter, the testing module 140 provides a data generation module 130 with the database query. The data generation module 130 may generate or otherwise obtains data records such that will affect a behavior of the DBMS 110 that handles the database query.

In some exemplary embodiments of the disclosed subject matter, the data generation module 130 generates exactly one data record for which all the constraints formulated by the database query are satisfied. In other exemplary embodiments of the disclosed subject matter, the data generation module 130 generates more than one data record, for example ten different data records, for which a subset of a set of constraints formulated in the database query are satisfied. It will be noted that the subset may be exactly the set of constraints or any strict subset of the set of constraints. In yet other exemplary embodiments of the disclosed subject matter, the data generation module 130 generates a data record that satisfies a portion of a second database query associated with the database query. The term associated may also mean that one query is equivalent, complementing, excluding, including, or otherwise being logically connected, or a combination of the above, to at least a portion second query. In some exemplary embodiments of the disclosed subject matter, an associated database query may be compiled, gathered, calculated, determined or otherwise obtained by attributing one or more subsets of a set of constraints formulated by a database query with one or more logical operations, such as negation, equivalence, complementation, inclusion, exclusion and the like. It will be noted that in some exemplary embodiments the second database query is equivalent to the database query.

In an exemplary embodiment of the disclosed subject matter, the data generation module 130 retrieves at least one data record from an independent database (not shown) such that the at least one data record relates to the database query. For example, the independent database may be a third-party benchmark database that contains a substantially equivalent schema to the schema of the DB 120. In some exemplary embodiments of the disclosed subject matter, the data generation module 130 receives additional information from a user, such as the user 180, to define a domain of a data field in a data record within the DB 120. The data generation module 130 may receive such additional information from an independent DB (not shown) such as a database on which the database query was originally performed. The data generation module 130 may update the DB 120 directly or indirectly through a DBMS such as DBMS 110 or by other equivalent means, to include data records that the data generation module 130 generated or retrieved. In other exemplary embodiments of the disclosed subject matter, the data generation module 130 may purge the DB 120 such that it contains no other data records except those the data generation module 130 generated. In yet other exemplary embodiments of the disclosed subject matter, the data generation module 130 may update the DB 120 such that it does not contain data records generated or retrieved by the data generation module 130.

Figure 2:
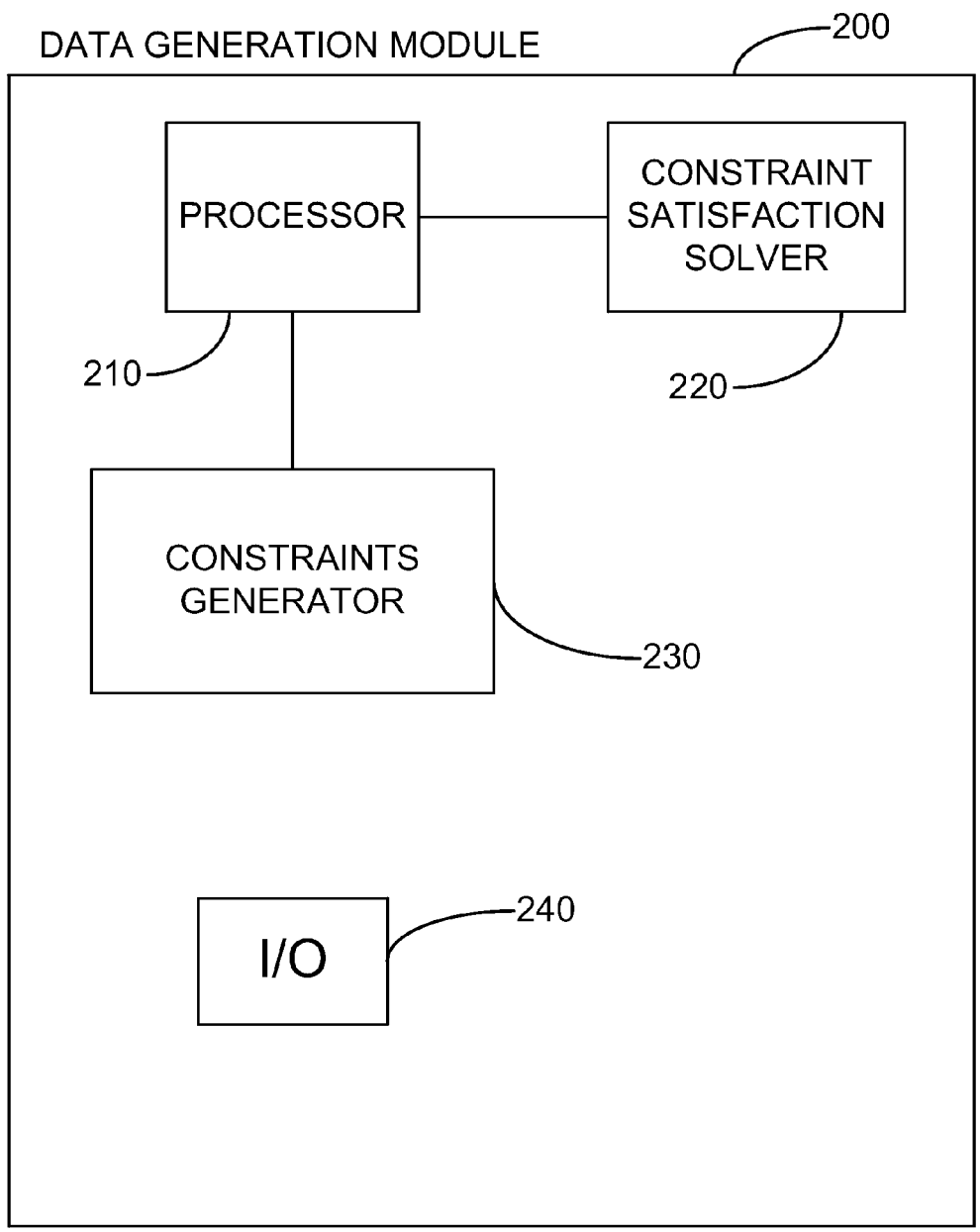
FIG. 2 shows a block diagram of a data generation module, in accordance with some aspects of the disclosed subject matter.

FIG. 2 shows a block diagram of a data generation module, in accordance with some aspects of the disclosed subject matter. A data generation module 200, such as 130 of FIG. 1, contains a processor 210 and an input/output device (I/O) 240. The I/O 240 may be utilized to receive data records from an independent database (not shown). The I/O 240 may further be utilized to perform operations on a designated database, such as DB 120 of FIG. 1. Some exemplary operations to be performed on the designated database may be an update operation, insertion of a data record, deletion of a data record, joining of several data structures and the like. The I/O 240 may additionally be utilized to receive a database query for which the data generation module 200 generates a data record. In some exemplary embodiments, the I/O 240 may receive information used to define a domain of at least one data field of the data record. For example, given a schema comprising a table "T" having two integer fields "a" and "b", a domain of "a" may be limited to include only integers of a specific range such as 0 . . . 100 or of a specific set such as {0,1,2,10,20,200}. The above domains are disclosed as exemplary domains only and other domains may be apparent to a person skilled in the art.

In response to receiving a database query, the data generation module 200 may utilize a constraints generator 230 to formulate a set of constraints in respect to the database query. For example, given an SQL database query of the form "select * from T where a>7", a set of constraints may be a single constraint formulating that the field "a" of table "T" must be greater than 7. The set of constraints may relate to more than one data record. For example, again relating to the above exemplary SQL database query, a set of constraints may be "(a0>7) and (a1>7) and (a0≠a1)" where a0 relates to an "a" field of a first data record and a1 relates to an "a" field of a second data record. It will be noted that a0 and a1 may be stored in a single vector, for example vector a, or otherwise coupled together. Given two data records in a database that satisfy the aforementioned exemplary set of constraints, a DBMS (not shown) should at least provide that two data records as a result of performing the above exemplary SQL database query. Additional example may be in case a sub-query is used, for example an SQL database query of the form "select * from T where a>7 and exists (select * from T where a<7)" may be formulated into a set of constraints such as "(a0>7) and (a1<7)". The constraints generator 230 may generate an original set of constraints such that a data record that relates to the database query satisfies the original set of constraints. The constraints generator 230 may further generate a second set of constraints such that a data record for which the second set of constraints is satisfied, satisfies a first subset of the original set of constraints and does not satisfy a second subset of the original set of constraints. The constraints generator 230 may generate a set of constraints according to predetermined characteristics, user decisions, heuristically-guided algorithms, database content and the like.

A constraint satisfaction solver 220 may be utilized to provide a data record that satisfies a subset of the set of constraints. In some exemplary embodiments, the constraint satisfaction solver 220 may be an interface to a third-party constraint satisfaction solver. In an exemplary embodiment of the disclosed subject matter, the constraints generator 230 generates a constraint satisfaction problem (CSP), a Boolean satisfiability problem (SAT) or the like. In some exemplary embodiments of the disclosed subject matter the constraint satisfaction solver 220 is a CSP solver, a SAT solver, a theorem prover, an integer linear programming solver or the like. In some exemplary embodiments of the disclosed subject matter, a CSP solver is utilized to solve a CSP that is defined using a triple <V,D,C> where V is a set of variables, D is a domain for each variable, and C is a set of constraints on the values of the variables. In some exemplary embodiments of the disclosed subject matter, each field of each data record is assigned a variable in the CSP. In other exemplary embodiments, some fields are not assigned a variable and their value is calculated, generated or chosen without the use of the CSP solver. For example, if a field of a data record is not a subject of a constraint, its value may be randomly chosen from an appropriate domain.

Figure 3:
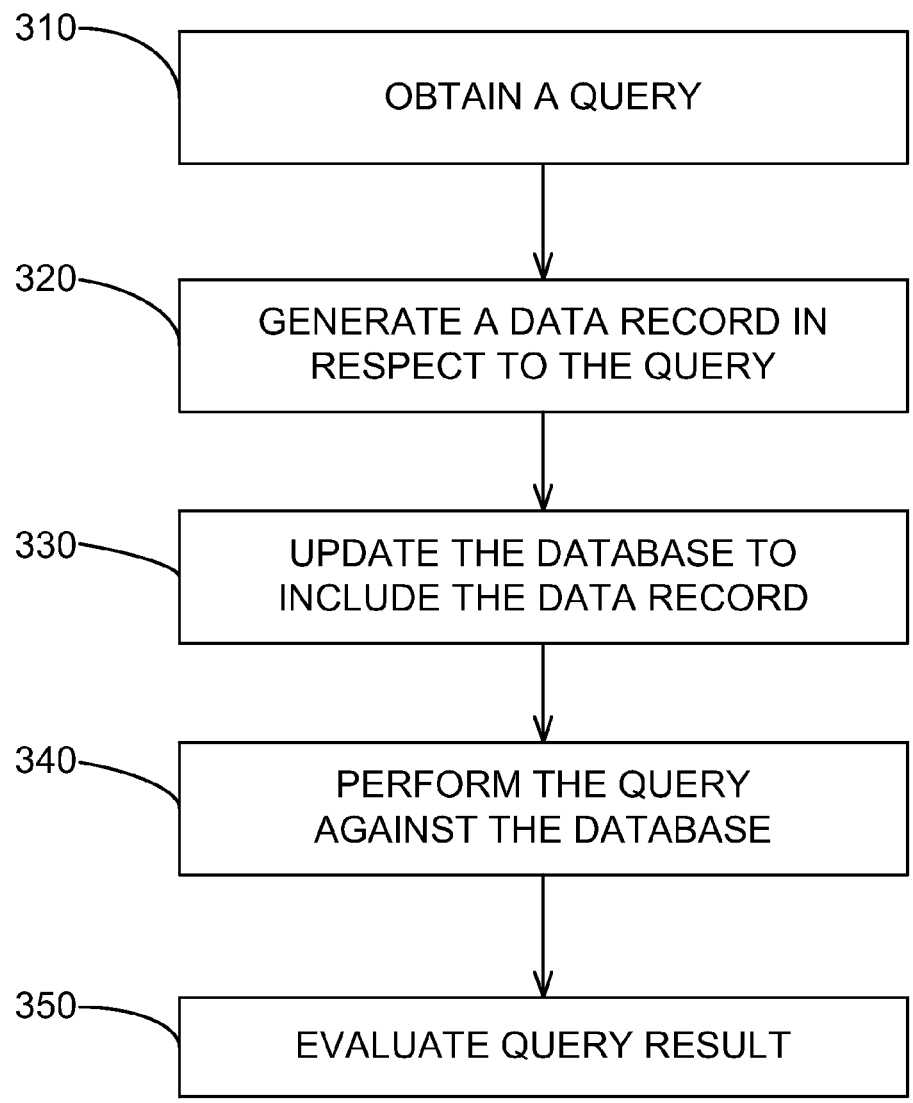
FIG. 3 shows a flowchart of a method for testing a DBMS, in accordance with some aspects of the disclosed subject matter.

FIG. 3 shows a flowchart of a method for testing a DBMS, in accordance with some aspects of the disclosed subject matter.

In step 310, a database query is obtained. In some exemplary embodiments of the disclosed subject matter, a query obtainer, such as 150 of FIG. 1, is utilized to obtain the database query.

In step 320, a data record is generated or retrieved in respect to the database query. In some exemplary embodiments of the disclosed subject matter, a data generation module, such as 130 of FIG. 1, is utilized to generate the data record. In some exemplary embodiments, the data record is stored within a computer readable medium. More than one data record may be generated or received. A first portion of the more than one data record may be characterized in that it complies with a set of constraints forced by the database query. A second portion of the more than one data record may be characterized in that it complies with a first subset of the set of constraints forced by the database query and does not comply with a second subset. Additional portions of the more than one data record may be characterized in a similar manner.

In some exemplary embodiments of the disclosed subject matter, the data record is generated in step 320 in order to force an execution of a predetermined or otherwise selected instruction of the DBMS, for example a specific optimization instruction. In other exemplary embodiments of the disclosed subject matter, the data record is generated in step 320 in order to verify the existence of at least one data record compliant with the constraints formulated by the database query. In yet other exemplary embodiments of the disclosed subject matter, the data record is generated in step 320 in order to verify that a portion of the data records in the database comply with the constraints formulated by the database query.

In step 330, a database may be updated to include the data record generated in step 320. The database may be purged of other data records such that it will only contain the data records generated in step 320. In other exemplary embodiments of the disclosed subject matter, an original content of the database is otherwise modified. In yet other exemplary embodiments of the disclosed subject matter, the original content of the database is not changed and the data record generated in step 320 is inserted to the database in addition to the original content. In an exemplary embodiment of the disclosed subject matter a database updating module is utilized to update a database. Step 330 may be performed using a DBMS or by directly modifying the database.

In step 340, a module, such as testing module 140 of FIG. 1, initiates the database query against the database using a DBMS. In some exemplary embodiments of the disclosed subject matter, the result returned by the DBMS is received or otherwise collected by a module such as a testing module 140 of FIG. 1.

In step 350, the results returned by the DBMS are evaluated to determine whether the operation of the DBMS was correct. In some exemplary embodiments of the disclosed subject matter, the data record generated in step 320 and inserted to the database in step 330, requires there to be at least a predetermined number of results to the database query. In other exemplary embodiments, the data record requires there to be at most a predetermined number of results or an exact number of results. In some exemplary embodiments of the disclosed subject matter, the number of returned data records may be inspected to determine whether the DBMS performed as expected. In other exemplary embodiments, a performance measurement of the DBMS may be inspected, such as the amount of time passed until the query results were determined, amount of resources required by the DBMS to perform and the like. In yet other exemplary embodiments, the method examines whether a catastrophical error occurred, such as a deadlock, a use of dangling pointer, division by zero, failing assertion and the like.

Figure 4:
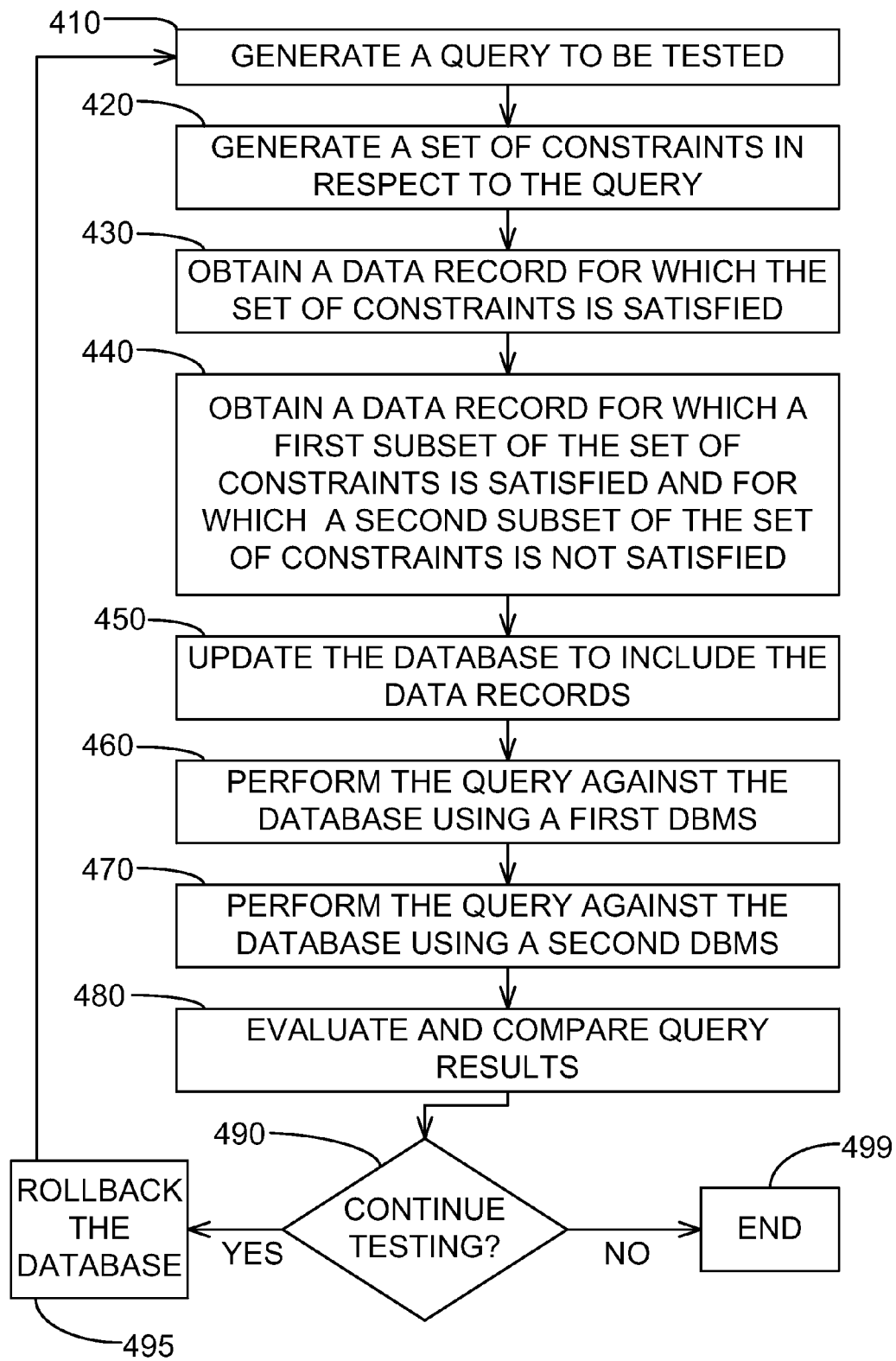
FIG. 4 shows a flowchart of a method for batch testing a DBMS, in accordance with some aspects of the disclosed subject matter.

FIG. 4 shows a flowchart of a method for batch testing a DBMS, in accordance with some aspects of the disclosed subject matter.

In step 410 a database query is generated by a query generator such as 160 of FIG. 1.

In step 420 a set of constraints in respect to the database query is generated by a constraints generator such as 230 of FIG. 2.

In step 430 a first data record for which the set of constraints is satisfied is obtained, retrieved or generated using a constraint satisfaction solver such as 220 of FIG. 2.

In step 440, a second data record is obtained for which a first subset of the set of constraints is satisfied and a second subset of the set of constraints is not satisfied. In some exemplary embodiments of the disclosed subject matter, a modified set of constraints is generated using the constraints generator such that a data record satisfying the modified set of constraint also satisfies the first subset of the set of constraints and does not satisfy a second subset of the set of constraints. In some exemplary embodiments, the modified set of constraints is formulated such that at least a portion of the second subset is not satisfied. In an exemplary embodiment of the disclosed subject matter the constraint satisfaction solver is utilized to obtain, retrieve or generate the second data subset based upon the modified set of constraints.

In step 450, a database is updated to include the first data record and second data record. In some exemplary embodiments the database is updated as aforementioned disclosed regarding step 330 of FIG. 3.

In step 460, the database query is performed using a first DBMS.

In step 470, the database query is performed using a second DBMS. In some exemplary embodiments of the disclosed subject matter, one of the first DBMS and second DBMS is a DBMS being tested and the other is a reliable DBMS being used to compare results with the DBMS being tested. It will be noted that the reliable DBMS may be a third-party DBMS, a previous version of the DBMS being tested such as a reliable and stable version, a DBMS being tested which does not execute a predetermined instruction, a DBMS being tested for which a predetermined optimization algorithm is turned off, and the like.

In step 480, query results returned by the first DBMS and the second DBMS are compared to determine that the DBMS being tested is functioning as expected. It will be noted that in some exemplary embodiments of the disclosed subject matter, step 470 may be optional and in step 480 an evaluation of the query results returned by the first DBMS may be performed in a similar manner to that disclosed with relation to step 350 of FIG. 3.

In step 490, a determination whether to continue testing is made. In case the testing ended, for example because all possible database queries were tested, due to user request, predetermined time limit reached, a predetermined number of erroneous behaviors have been detected and the like, the method ends in step 499. In case additional testing is determined to be performed, step 495 may be performed to rollback the database to its state before updating was performed in step 450. In case the DBMS being tested does not support rollback operations directly, the functionality may be achieved in other methods such as storing an original content of the database before step 450 and updating it again to store the original content in step 495. In some exemplary embodiments of the disclosed subject matter, rollback may be skipped, for example in order to provide a database with many data records.

In step 410 a different database query may be generated, obtained or retrieved in order to be tested. In some exemplary embodiments of the disclosed subject matter, a database query may be tested several times against several different states of the database. For example, it may be desirable to test the DBMS performance and result in regard to a database query when a predetermined number of results are contained in the database, when the database has a predetermined amount of data records, for example one million, when the number of result that are contained in the database is a predetermined portion of a total data records in the database, for example 5%, and the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method performed by a processor, the method comprising:
   testing a database management system of a database by:
   generating in the database at least one data record based on a database query to the database management system, so that upon execution of the database query by the database management system the at least one data record is involved in processing the database query;
   wherein said generating comprises:
   identifying a set of constraints in the database query;
   determining a satisfaction problem of a data record that is characterized in satisfying at least a portion of the set of constraints;
   solving the satisfaction problem using a satisfaction problem solver, thereby determining the data record, wherein the satisfaction solver is selected from a group consisting of: a Constraint Satisfaction Problem (CSP) solver, a Boolean satisfiability problem (SAT) solver, a theorem prover, and a linear programming solver; and
   updating the database to include the data record;

performing the database query by the database management system, wherein operation of the database management system is affected by the database retaining the at least one data record; and whereby the database management system is tested with respect to the database query.

2. The computer-implemented method of claim 1, wherein the database management system is operative not to update the database in response to the database query, whereby said testing causes a modification to the database that does not flow from the database query.

3. The computer-implemented method of claim 1, wherein the set of constraints relates to a subquery of the database query.

4. The computer-implemented method of claim 1, wherein said determining the CSP comprises determining a CSP of a plurality of data records that are characterized in satisfying different portions of the set of constraints; thereby solving the CSP determines the plurality of data records; and said updating comprises updating the database to include the plurality of data records.

5. The computer-implemented method of claim 1, wherein the data record is operative to ensure that the database management system will execute a predetermined instruction in response to the database query.

6. The computer-implemented method of claim 5, wherein the predetermined instruction is an optimization instruction, whereby said testing tests operation of the optimization instruction.

7. The computer-implemented method of claim 1, wherein said testing further comprises comparing a result of said performing the database query by the database management system with an expected result.

8. The computer-implemented method of claim 7, wherein said testing further comprises performing the database query upon the database using a second database management system thereby obtaining the expected result.

9. The computer-implemented method of claim 1, wherein the satisfaction problem is a Constraint Satisfaction Problem (CSP), and wherein the satisfaction solver is a CSP solver.

10. A computerized apparatus comprising:
a processor which is arranged to:
test a database management system of a database by:
generating in the database at least one data record based on a database query to the database management system, so that upon execution of the database query by the database management system the at least one data record is involved in processing the database query;
wherein said generating comprises:
identifying a set of constraints in the database query;
determining a satisfaction problem of a data record that is characterized in satisfying at least a portion of the set of constraints;
solving the satisfaction problem using a satisfaction problem solver, thereby determining the data record, wherein the satisfaction solver is selected from a group consisting of: a Constraint Satisfaction Problem (CSP) solver, a Boolean satisfiability problem (SAT) solver, a theorem prover, and a linear programming solver; and
updating the database to include the data record; and
performing the database query by the database management system, wherein operation of the database management system is affected by the database retaining the at least one data record.

11. The computerized apparatus of claim 10, wherein the database management system is operative not to update the database in response to the database query, whereby said processor is configured to cause, during testing, a modification to the database that does not flow from the database query.

12. The computerized apparatus of claim 10, wherein the set of constraints relates to a subquery of the database query.

13. The computerized apparatus of claim 10, wherein said determining the CSP comprises determining a CSP of a plurality of data records that are characterized in satisfying different portions of the set of constraints; thereby solving the CSP determines the plurality of data records; and said updating comprises updating the database to include the plurality of data records.

14. The computerized apparatus of claim 10, wherein the data record is operative to ensure that the database management system will execute a predetermined instruction in response to the database query.

15. The computerized apparatus of claim 14, wherein the predetermined instruction is an optimization instruction, whereby said processor is arranged to test operation of the optimization instruction.

16. The computerized apparatus of claim 10, wherein said processor is arranged to perform the testing by comparing a result of said performing the database query by the database management system with an expected result.

17. The computerized apparatus of claim 16, wherein said processor is arranged to perform the testing by performing the database query upon the database using a second database management system thereby obtaining the expected result.

18. The computerized apparatus of claim 10, wherein the satisfaction problem is selected from the group consisting of: a Constraint Satisfaction Problem (CSP) and a Boolean satisfiability problem (SAT).

19. A computer program product, said computer program product comprising:
a non-transitory computer readable medium, in which computer instructions are stored, which instructions, when read by a computer, cause the computer to:
test a database management system of a database by:
generating in the database at least one data record based on a database query to the database management system, so that upon execution of the database query by the database management system the at least one data record is involved in processing the database query;
wherein said generating comprises:
identifying a set of constraints in the database query;
determining a satisfaction problem of a data record that is characterized in satisfying at least a portion of the set of constraints;
solving the satisfaction problem using a satisfaction problem solver, thereby determining the data record, wherein the satisfaction solver is selected from a group consisting of: a Constraint Satisfaction Problem (CSP) solver, a Boolean satisfiability problem (SAT) solver, a theorem prover, and a linear programming solver; and
updating the database to include the data record; and
performing the database query by the database management system, wherein operation of the database management system is affected by the database retaining the at least one data record.

* * * * *